United States Patent
Khare et al.

(10) Patent No.: US 8,189,735 B2
(45) Date of Patent: May 29, 2012

(54) SYSTEM AND METHOD FOR RECONSTRUCTION OF X-RAY IMAGES

(75) Inventors: Kedar Bhalchandra Khare, Guilderland, NY (US); Jeffrey Wayne Eberhard, Albany, NY (US); Bernhard Erich Hermann Claus, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/841,815

(22) Filed: Jul. 22, 2010

(65) Prior Publication Data
US 2012/0020448 A1   Jan. 26, 2012

(51) Int. Cl.
*A61B 6/00*   (2006.01)
(52) U.S. Cl. .......................................................... 378/4
(58) Field of Classification Search ...... 378/4; 382/128, 382/131
See application file for complete search history.

(56) References Cited

U.S. PATENT DOCUMENTS

| | | | |
|---|---|---|---|
| 4,593,355 A * | 6/1986 | Chase | 382/131 |
| 4,626,991 A * | 12/1986 | Crawford et al. | 378/4 |
| 4,888,693 A * | 12/1989 | Tam | 378/4 |
| 5,053,958 A * | 10/1991 | Tam | 378/4 |
| 5,671,265 A * | 9/1997 | Andress | 378/98.11 |
| 5,744,802 A * | 4/1998 | Muehllehner et al. | 250/363.03 |
| 5,907,594 A * | 5/1999 | Lai | 378/4 |
| 5,909,476 A * | 6/1999 | Cheng et al. | 378/4 |
| 6,339,652 B1 * | 1/2002 | Hawkins et al. | 382/131 |
| 6,768,782 B1 * | 7/2004 | Hsieh et al. | 378/8 |
| 7,254,209 B2 * | 8/2007 | Zhao et al. | 378/4 |
| 7,650,023 B2 | 1/2010 | Fischer et al. | |
| 7,653,172 B2 * | 1/2010 | Härer et al. | 378/8 |
| 7,693,318 B1 | 4/2010 | Stalling et al. | |
| 7,702,141 B2 | 4/2010 | Sirohey et al. | |
| 7,885,371 B2 * | 2/2011 | Thibault et al. | 378/4 |
| 7,916,828 B1 | 3/2011 | Khare et al. | |
| 7,940,884 B2 * | 5/2011 | Bruder et al. | 378/4 |
| 2003/0156684 A1 * | 8/2003 | Fessler | 378/210 |
| 2006/0072801 A1 * | 4/2006 | Bernard Deman et al. | 382/131 |
| 2007/0110290 A1 * | 5/2007 | Chang et al. | 382/128 |
| 2008/0063247 A1 * | 3/2008 | Griswold | 382/128 |

OTHER PUBLICATIONS

Emil Y Sidky, et al., Image Reconstruction in Circular Cone-Beam Computed Tomography by Constrained, Total-Variation Minimization, Phys. Med. Biol, Sep. 7, 2008; 53(17): 4777-4807.
Y. Nesterov, A Method for Solving the Convex Programming Problem With Convergence Rate $O(1/k^2)$, Soviet Math. Doki. 27(2): 372-376 (1983).
Amir Beck, et al., A Fast Interative Shrinkage-Thresholding Algorithm for Linear Inverse Problems, Siam J. Imaging Sciences, 2(1): 183-202 (2009).

* cited by examiner

*Primary Examiner* — Alexander H Taningco
(74) *Attorney, Agent, or Firm* — The Small Patent Law Group; Dean D. Small (57) ABSTRACT

Systems and method for reconstruction of x-ray images are provided. One method includes acquiring a plurality of image views using an x-ray imaging system, the plurality of image views defining a limited tomographic dataset. The method also includes performing three-dimensional (3D) image reconstruction using the plurality of image views in an iterative reconstruction, wherein the iterative reconstruction includes forming a linear combination based on a plurality of previous iteration results. The method further includes displaying an image based on the image reconstruction, wherein the image includes clinically relevant high-frequency detail information.

25 Claims, 7 Drawing Sheets

SYSTEM AND METHOD FOR RECONSTRUCTION OF X-RAY IMAGES

BACKGROUND OF THE INVENTION

The subject matter disclosed herein relates generally to x-ray imaging systems, and more particularly to x-ray imaging systems that generate three-dimensional (3D) images.

X-ray imaging systems have many different configurations and are used in many different applications. For example, known x-ray absorption based imaging systems cover a wide range of imaging geometries, such as helical or step-and-shoot type computed tomography (CT) scanners, mammography or radiology-tomography (rad-tomo) systems with single arc/line/two-dimensional (2D) source trajectories, multi-view security systems, laminography type inspection systems, among others. The helical/step-and-shoot type full CT scanners typically acquire about 1000 or more views circularly around an object (e.g., a patient or luggage) for imaging each slice of a 3D volume of the object. These scanners are suitable when accurate 3D representation of imaging volume is needed. On the other hand, mammography or rad-tomo type systems or multi-view baggage scanning systems typically involve a much smaller number of views (e.g., about 5-60 views) and are suitable when the application requires viewing the 3D image volume only along certain specified orientations.

Accordingly, there is a wide gap in the application space between full CT scanners and other X-ray systems, due to the 3D image quality that is conventionally achievable with these different types of systems. For example, in x-ray tomosynthesis systems, planar two-dimensional (2D) or arc type source trajectories can acquire 3D depth information. However, when conventional reconstruction methods are employed for image formation, the resultant images are highly degraded. In particular, filtered backprojection type approaches often result in severe streaking in the images, and iterative approaches (even those based on using image domain priors or constraints, which can mitigate artifact levels to some extent) suffer from very slow convergence properties due to the highly incomplete nature of the data, thus resulting in images that lack high frequency details.

BRIEF DESCRIPTION OF THE INVENTION

In accordance with one embodiment, a method for reconstructing images is provided. The method includes acquiring a plurality of image views using an x-ray imaging system, the plurality of image views defining a limited tomographic dataset. The method also includes performing three-dimensional (3D) image reconstruction using the plurality of image views in an iterative reconstruction, wherein the iterative reconstruction includes forming a linear combination based on a plurality of previous iteration results. The method further includes displaying an image based on the image reconstruction, wherein the image includes clinically relevant high-frequency detail information.

In accordance with another embodiment, a method for reconstructing x-ray tomographic images is provided. The method includes acquiring a plurality of image views using an x-ray imaging system, wherein the plurality of image views defines a limited tomographic dataset. The method also includes forming a linear combination of at least two reconstruction values for an iterative image reconstruction and applying at least one sparsity transformation. The method further includes forward projecting the sparsity transformed linear combination and subtracting a result from data corresponding to the plurality of images views. The method additionally includes displaying a three-dimensional (3D) image when a convergence level has been reached, wherein the 3D image formed from the limited tomographic dataset has an image quality less than and within an image margin of a full computed tomography (CT) scanner image quality.

In accordance with yet another embodiment, a tomographic x-ray imaging system is provided that includes an x-ray source, an x-ray detector configured to detect x-rays impinging thereon after passing through an object and a data acquisition system configured to acquire limited tomographic data from the x-ray detector. The tomographic x-ray imaging system also includes an image reconstruction module configured to perform image reconstruction using the limited tomographic data in an iterative reconstruction, wherein the iterative reconstruction includes forming a linear combination based on a plurality of previous iteration results. The tomographic x-ray imaging system further includes a display for displaying an image based on the image reconstruction, wherein the image includes clinically relevant high-frequency detail information.

DETAILED DESCRIPTION OF THE INVENTION

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide methods and systems for image reconstruction, particularly for limited or reduced view tomographic data acquisition, which may be acquired by different x-ray imaging systems. For example, by practicing at least some embodiments, x-ray imaging systems with 10-100 times less views compared to full CT scanners may be used with reconstruction methods for enabling three-dimensional (3D) imaging applications. A technical effect of at least one embodiment is providing fast and high quality image reconstruction from limited tomographic data that enables 3D imaging with limited view tomographic systems. Additionally, increased or improved image quality for limited view x-ray imaging systems results from practicing at least some of the embodiments described herein.

It should be noted that although the various embodiments may be described in connection with a particular imaging system, such as an x-ray imaging system for diagnostic imaging, the various embodiments are not limited to a particular imaging system or one having a particular configuration. For example, the various embodiments may be implemented in connection with non-medical, security and inspection systems, among others. Additionally, the various embodiments may include other projection based imaging modalities such as Positron Emission Tomography (PET), Single Photon Emission Computed Tomography (SPECT), among others.

In accordance with various embodiments, optimal gradient type methods for iterative image reconstruction may be combined with prior information (e.g., prior iteration reconstruction solutions) that represents additional constraints on the image (e.g. smoothness, positivity, etc.). For example, two or more prior solutions or iterations may be used for a subsequent iterative update step in the reconstruction process.

Various embodiments are used to generate 3D images in a CT imaging system wherein a limited or reduced dataset is acquired by the x-ray imaging system. For example, a reconstruction process 30 is illustrated by the system workflow diagram shown in FIG. 1. The process 30 includes acquiring limited or reduced tomographic data 32, which is acquired by an x-ray imaging system 34. In some embodiments, the limited or reduced tomographic data 32 includes a dataset having a limited or reduced number of image or projection views 36, such as acquired by employing various source and/or detector trajectories, for example, source and detector motion in a circle, a fixed detector with a source moving in a straight line, an arc or other more complex curves, among others and combinations thereof. For example, in some embodiments, the dataset includes between about 50 and about 100 image views. However, other numbers of views may be acquired and used, such as above about 30 views to less than about 1000 views. Accordingly, in some embodiments, and merely for illustration, the x-ray imaging system 34 acquires more views than about 1-30, but less than 1000. Thus, the x-ray imaging system 34 may be configured as a low dose x-ray imaging system for 3D imaging that acquires, in some embodiments, more image views than, for example, an x-ray radiography system, a mammography system, a digital tomosynthesis system, a low cost small footprint system, among others. The source and detector trajectories may be selected as appropriate (e.g., as desired or needed) for obtaining or capturing object information based on a particular system application and constraints. For example, source and detector trajectories may be selected to optimize the object information being obtained based on the system application or constraints to capture the best (e.g., most clinically relevant) information. In these embodiments, the x-ray imaging system 34 also acquires less image views than a full CT scanner providing a complete 3D information dataset, which acquires 1000 or more views.

Conventional image compression standards (e.g., Joint Photographic Experts Group (JPEG) compression) illustrate that natural images are highly redundant in the usual pixel/voxel basis representations and have sparse representations in transform domains (e.g., in wavelet/gradient/other transform domains). In accordance with various embodiments, less than the conventional amount or number of data/views is used by imposing transform-domain sparsity constraints on the 3D image during the reconstruction process.

Figure 1:
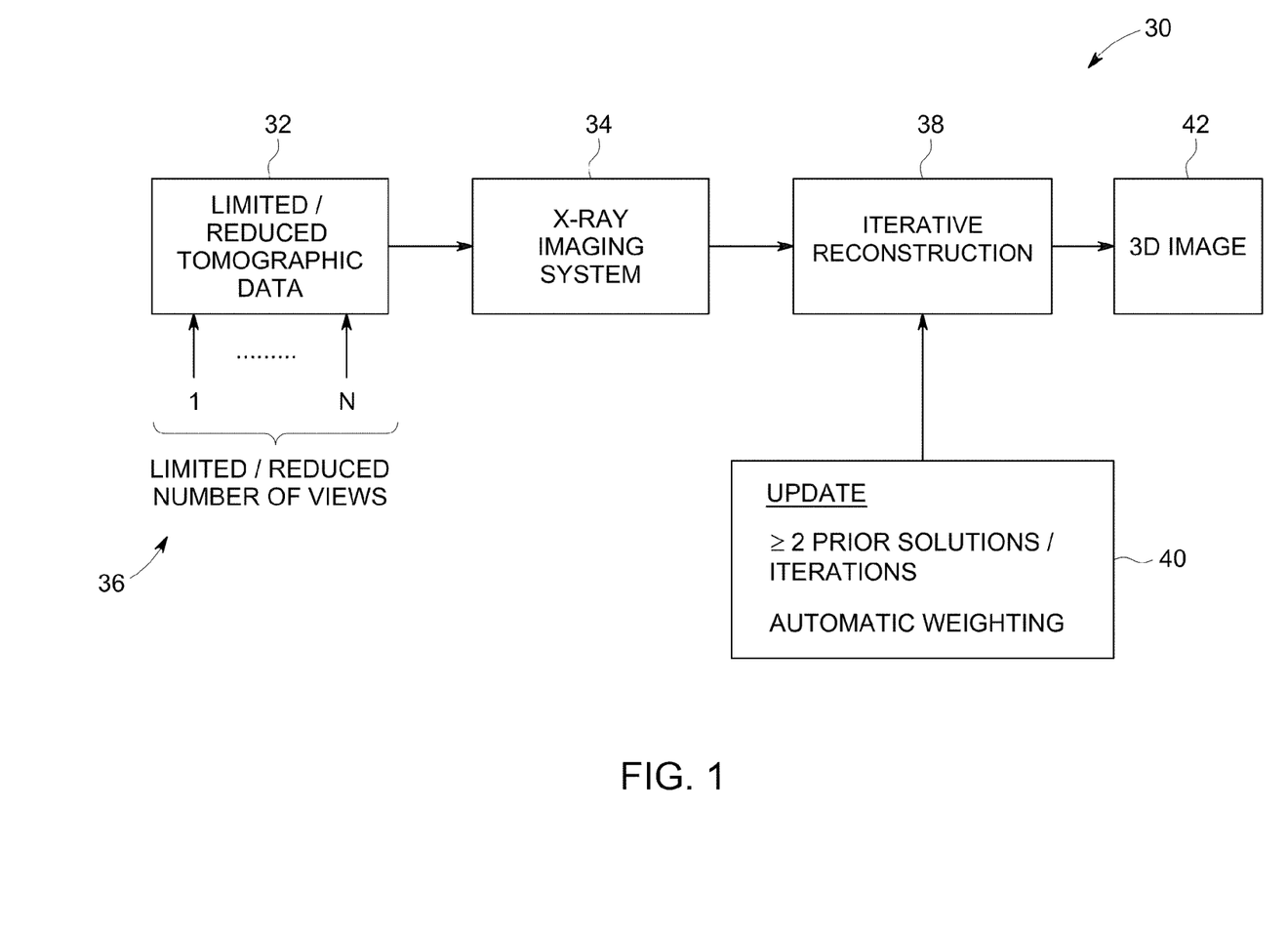
FIG. 1 is a system workflow diagram illustrating an image reconstruction process in accordance with various embodiments.

The process 30 includes using the limited or reduced tomographic data 32 acquired by the x-ray imaging system 34 in an iterative reconstruction process 38. The iterative reconstruction process 38 operates to reconstruct images wherein N pixels are reconstructed based on less than N measurements, such as less than the number of views used in a conventional CT scanner (e.g., full CT scanner), while providing high quality images that include diagnostically relevant information. The iterative reconstruction process 38 in some embodiments is performed to minimize a cost function that represents the data consistency and an additional set of priors (e.g., prior solutions) representing constraints on the solution or convergence of the iterative reconstruction. The iterative reconstruction process 38 is performed using a reduced number of iterations and uses update information 40 in an iterative update step that includes two or more prior solutions or iteration information, as well as automatic weighting for a cost function of the reconstruction process. For example, in some embodiments, an optimal gradient method may be used as described in more detail herein, wherein two prior iterations are used for updating the starting point for the next iteration.

The iterative reconstruction process 38 is performed until a convergence is reached for reconstructing a 3D image 42, which may be displayed to a user or operator of the x-ray imaging system 34. In various embodiments, the determination of when convergence is reached is based on when an accuracy level criterion or threshold is satisfied, for example, a 1%, 2%, etc. level of accuracy (e.g., residual error) based on the acquired data, thereby defining a cost function minimization.

The iterative reconstruction process 38 is performed in various embodiments to converge to a solution that is within an acceptable residual error level. The iterative reconstruction process 38 provides convergence such that images with high frequency details are obtained using a same number of iterations that would otherwise result in blurred images. The iterative reconstruction process 38 essentially solves a reconstruction problem defined by a linear system of equations as follows:

$$Y = Af \qquad \text{Equation 1}$$

In Equation 1, Y is the Sub-Nyquist sampled data, A is a system operator (forward projection from image to data space) and f is the image to be reconstructed. The iterative reconstruction process 38 may perform an iterative convergence method to find the least squared solutions for Equation 1, wherein Y represents a dataset having less data (e.g., a limited or reduced number of image or projection views) than would be needed to perform image reconstruction. In particular, a minimization problem may be defined as cost function C(f) as follows:

$$C(f) = \|y - Af\|_2 + \lambda_1 \|Wf\|_1 + \lambda_2 \|\nabla f\|_1 \qquad \text{Equation 2}$$

In Equation 2, the $\|y-Af\|_2$ term represents data consistency, which is to be reduced or minimized and the $\lambda_1\|Wf\|_1 + \lambda_2\|\nabla f\|_1$ terms represent sparsity transformations, which are additional constraints on the image (e.g. attenuation coefficients, smoothness, positivity, etc.). In this Equation 2, $\lambda_1, \lambda_2$ are weighting or penalty factors, Wf represents a wavelet transform of the image and $\nabla f$ represents the gradient of the image so that the corresponding term in Equation 2 represents the total variation of the image f The terminology $\|\ldots\|_1$ refers to the L1-norm (sum of absolute values of components) of the quantity inside and $\|\ldots\|_2$ refers to the L2-norm (sum of absolute value squares of components). As described in more detail herein, the $\lambda_1, \lambda_2$ terms are selected automatically and determines the significance or value of the terms to data consistency.

Figure 2:
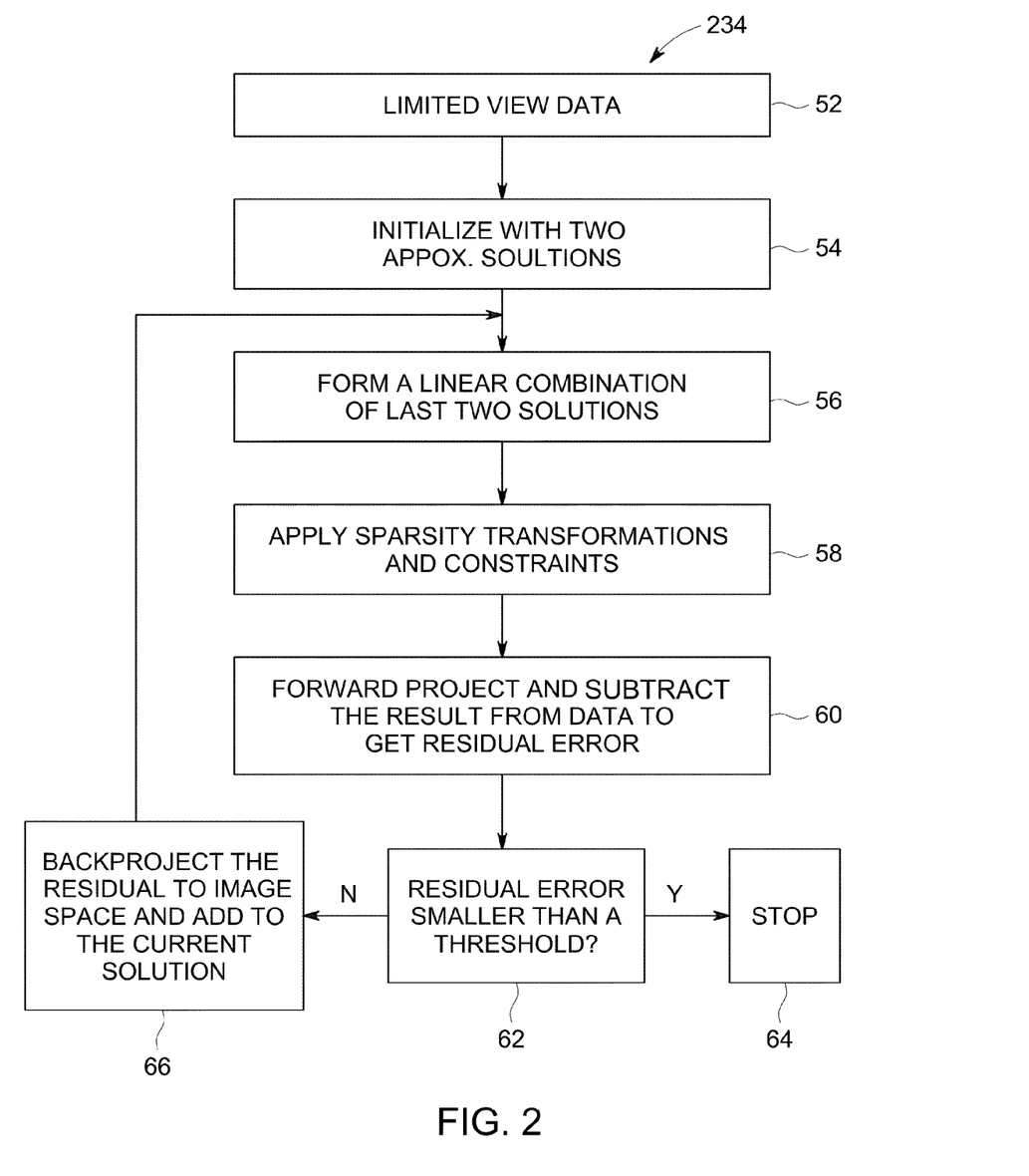
FIG. 2 is a flowchart of method for image reconstruction in accordance with various embodiments.

Referring now to FIG. 2, a method 50 for image reconstruction is shown, which may be performed, for example, during the iterative reconstruction process 38. The method 50 generally includes obtaining limited view data at 52, which may be, for example, the limited or reduced tomographic data 32 that includes the dataset having a limited or reduced number of image or projection views 36 (both show in FIG. 1). For example, in some embodiments, a dataset having between about 50 and 100 views or projections is used by the method 50. Thus, the acquired data includes a plurality of views or projections generated by the x-ray imaging system. Additionally, information is received from the x-ray imaging system or user, such as information regarding the parameters used for the acquisition. Such information may include, for example, patient information, calibration data, and image acquisition timing data, among other information.

Thereafter, an iterative process is initialized at 54 using two of more starting points, for example, two or more initial values or approximations (which may be arbitrarily selected using, for example, backprojection of the limited data to image space and by applying further processing, such as smoothing and/or filtering) and then at 56 a linear combination is formed based on the last two solutions. As the iterative method 50 continues, the last two solutions are defined by the prior two iterations of the method 50 (or by the initial values if the process is in the first iteration). The initial values may be initial voxel or pixel values for a volume of interest. Thus, two prior iterations are used for updating the next approximation or reconstruction iteration. The linear combination provides a solution for the data consistency term. For example, in some embodiments, a Nesterov optimal gradient algorithm is used for the data consistency term and is defined as follows:

$$f^{n+1} = g^n + \tau A^T(y - A g^n) \qquad \text{Equation 3}$$

$$g^n = f^n + \frac{n-1}{n+2}(f^n - f^{n-1}) \qquad \text{Equation 4}$$

In Equations 3 and 4, $f^n$ is the prior approximation at the nth iteration, $g^n$ is the linear combination of $f^n$ and $f^{n-1}$, and other like terms have similar definitions to the terms in Equations 1 and 2. A and $A^T$ represent the forward projection (3D image space to projection space) and the backprojection (projection to the 3D image space), respectively, and $\tau$ is a scaling constant (e.g., as appropriate according to system configuration).

Thereafter, sparsity transformations and constraints are applied at 58. For example, sparsity transformations and constraints as described in more detail above in connection with Equation 2 are added to the cost function minimization equation. The result is then forward projected and subtracted from the data (as defined by the dataset at 52) to obtain a residual error at 60. The forward projection is represented in Equation 3 by $A g^n$ and the subtraction is represented by the $(y - A g^n)$ term. The term $A^T(y - A g^n)$ represents the backprojection of the residual $(y - A g^n)$ from the projection to the 3D image space.

A determination is then made at 62 as to whether a residual error is within an acceptable level, for example, smaller or less than a predetermined threshold accuracy percentage. The threshold value may be, for example, a 1%, 2%, 3%, etc. accuracy level. If the residual error is within the acceptable level, namely lower than the threshold level, then the method 50 stops at 64 as the solution, namely that the voxel values for the reconstructed image have converged to an acceptable solution. The reconstructed image then may be displayed.

However, if at 62, the residual error is not within the acceptable level, such that the value is above the threshold value, then the process continues through another iteration, and in particular, at 66 a backprojection of the residual data is performed, for example, backprojecting to the voxels in the volume that were mapped to a pixel in the forward projection. For example, the residual data is backprojected to the image space (voxels) and added to the current iteration solution. In particular, this data is combined with two previous iterations or solutions, which may include an initial value if the method 50 is not past the second iteration. Thus, a linear combination is again formed at 56 based on at least the last two iteration solutions. It should be noted that more than two previous solutions may be used.

It also should be noted that the process includes reducing or limiting artifacts, noise, etc. using weighting, which may include applying a penalty weighting when forming the linear combination and as described in more detail herein. The determination of the weighting value is performed automatically. For example, the artifact or noise may be estimated at any point in the method 50 and the weighting value determined based on the size of the artifact or noise. The weighting value is then used in the next step of the method 50 or in the next iteration.

In various embodiments, the penalty weights are automatically selected. In particular, the values for $\lambda_1, \lambda_2$ etc. are automatically selected, for example, in a data driven manner as illustrated in the method 70 shown in FIG. 3. The cost function or equation described herein is parameterized using the values for $\lambda_1, \lambda_2$ etc., with each value generating a different solution.

Figure 3:
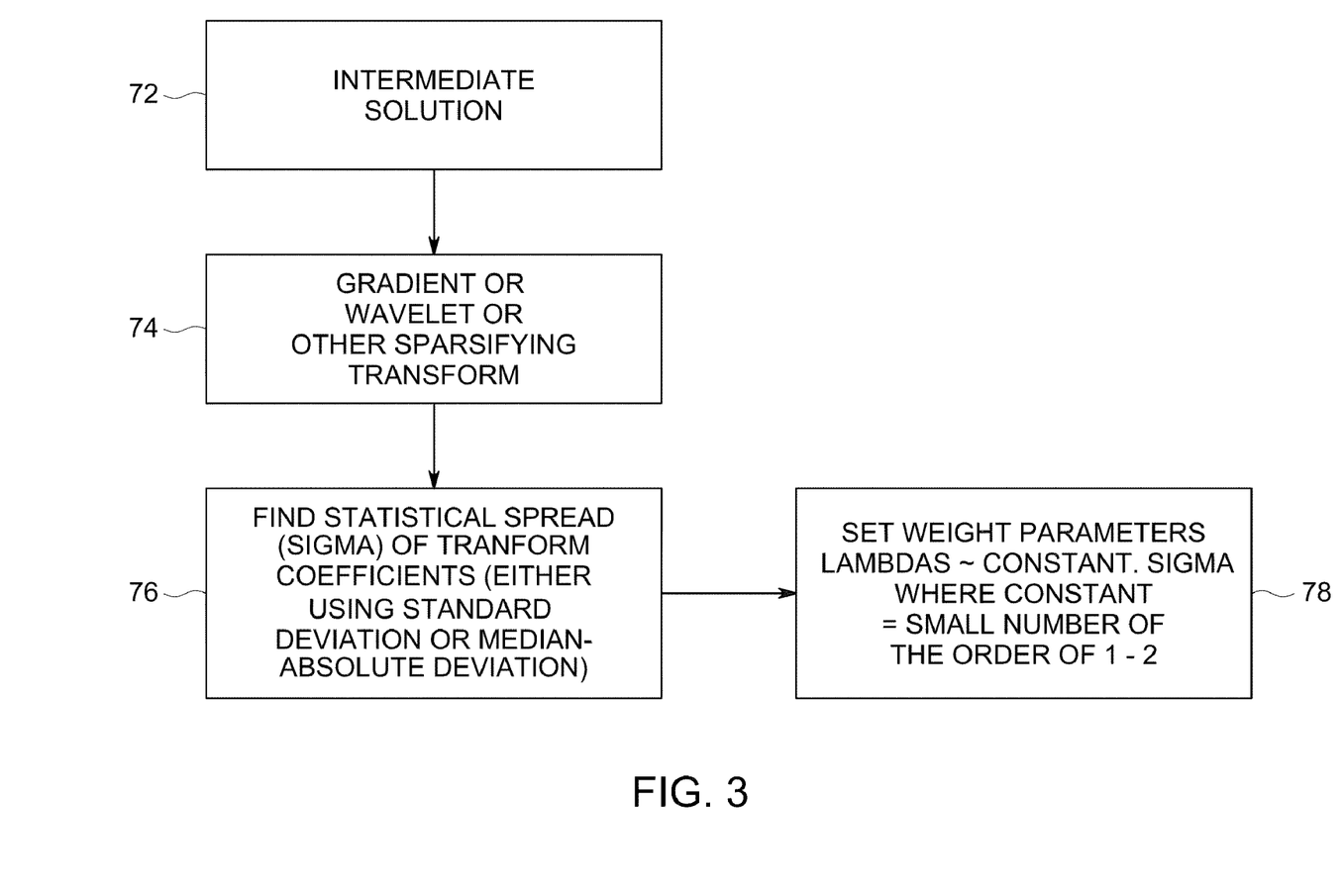
FIG. 3 is a flowchart of a method for automatically selecting weighting values in accordance with various embodiments.

In particular, an intermediate solution is determined at 72. The intermediate solution is formed by the linear combination of the two previous solutions, for example, which is the result of step 56 in FIG. 2. Thus, the intermediate solution is the linear combination of the previous two solutions at each iteration of the method 50 (shown in FIG. 2). Accordingly, an intermediate solution is generated at each iteration of the method 50. It should be noted that the method 70 in various embodiments is performed on full image data or data for local regions of an image. Additionally, the method may be performed at different resolution scales.

After obtaining the intermediate solution, a gradient, wavelet or other sparsifying transform is performed at 74. For example, the wavelets or sparsity transforms may be added to the cost function illustrated in Equation 2. Thereafter, a statistical spread, such as a determination of a standard deviation (sigma value) is determined at 76 using any suitable method. For example, the statistical spread of the transform coefficients are determined using the standard deviation or median-absolute deviation.

Thereafter, the weighting values or parameters are set at 78 based on the statistical spread. It should be noted that the variance (sigma) in various embodiments is about constant for each of the weighting parameters. Also, it should be noted that in various embodiments, when sigma is constant, the weighting value is selected as a smaller number, such as in the order of 1-2.

Thus, in accordance with various embodiments, a converging iterative reconstruction process is provided that uses two prior solutions or iterations for calculating the value(s) for the next iteration. For example, each iteration of the image reconstruction process includes a linear combination of two previous solutions or results from two previous iterations. Accordingly, in various embodiments, one iteration of a reconstruction process may be defined as follows:

$$f^{n+1}=P[g^n+\tau A^T(y-A\,g^n)] \quad \text{Equation 5}$$

$$g^n=a(n)f^n+b(n)f^{n-1} \quad \text{Equation 6}$$

It should be noted that like variables are defined similarly unless otherwise noted. In Equation 5, P represents the sparsification operation, which may include, for example, thresholding in the image or other transform domain (e.g. wavelets), total variation minimization, other constraints based on prior information (e.g., positivity, smoothness requirements, etc.), filtering operations in the data and/or image domain, other thresholding operations, etc. Thus, P is a term that includes the sparsity transforms, such as image transforms, etc.

Thus, various embodiments employ optimal gradient type methods for iterative image reconstruction combined with at least two prior solutions or values that represent additional constraints on the image (e.g. smoothness, positivity, etc.). The iterative reconstruction methods can provide 3D imaging with limited view x-ray systems. The image reconstruction for limited view tomographic data systems, thus, involves solving an incomplete system of linear equations as set forth in Equation 1 (y=Af), where again, y is the projection data, A is the system operator, and f is the image to be determined.

The iteration performed in various embodiments includes the use of two or more prior solutions for the update step. In various embodiments, an iteration is thus performed as follows: $f^{n+1}=P[g^n+\tau A^T(y-Ag^n)]$, where $g^n=a\,f^n+b\,f^{n-1}$ for constants a and b that typically depend on the iteration number. In particular, a and b may be selected according to Nesterov's optimal gradient method. The L2-norm convergence for such methods is known to be about $O(1/n^2)$. Thus, a typical number of iterations in order to obtain L2-norm error of E is about $1/\sqrt{E}$, representing a reduction in the number of iterations for convergence for limited view X-ray imaging applications. Various embodiments use more than one prior image solution (instead of only one) for the iterative update, which provides a convergence rate such that higher quality images are generated with the same number of iterations that would otherwise result in lower quality images (e.g., blurred images).

Figure 4:
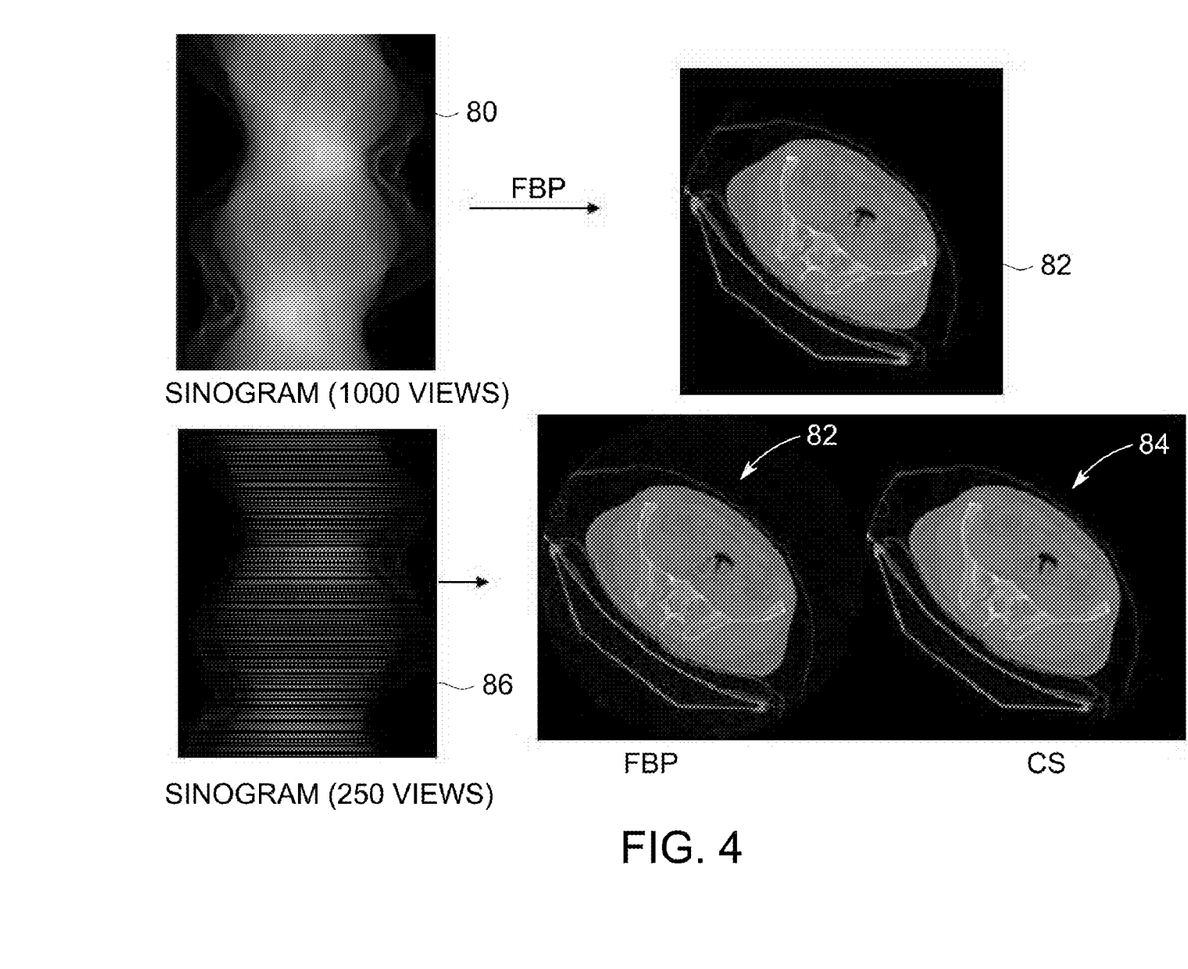
FIG. 4 is a diagram illustrating images formed from different reconstruction processes.

Thus, as illustrated in FIG. 4, a dataset, illustrated as a sinogram dataset (having 1000 views) represented by the image 80 may be used to reconstruct an image 82, which in this embodiment is an imaged pelvic region. The reconstruction method used is a filtered backprojection reconstruction method. As can be seen in the reconstructed image 84, which is reconstructed using the iterative process described herein, an image 84 of similar quality to the image 82 may be generated with less data, for example, a sinogram dataset having 250 views as illustrated by the image 86.

Figure 5:
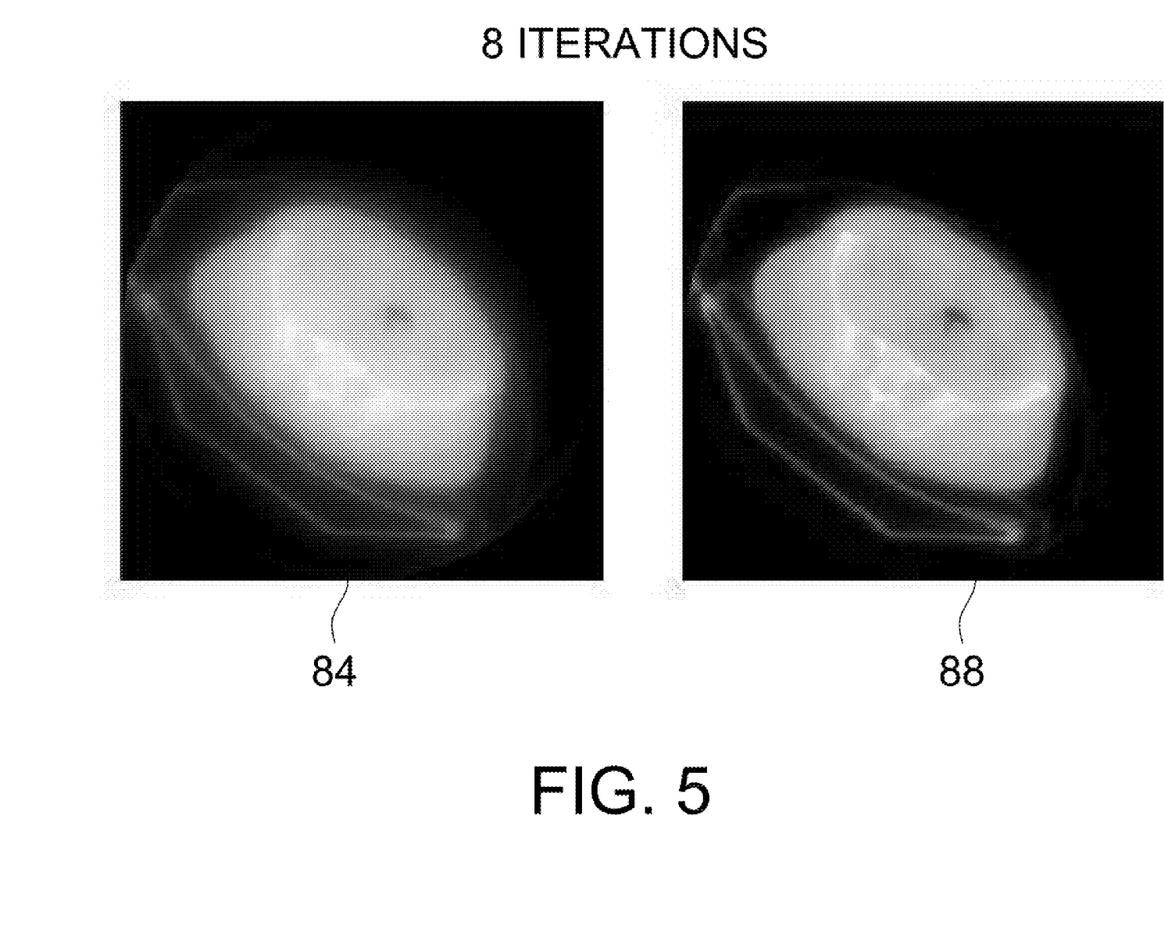
FIG. 5 is a diagram showing one of the images of FIG. 4 and an image formed by an image reconstruction process of one embodiment.

With reference now to FIG. 5, various embodiments of reconstruction method described herein provide improved image quality as illustrated by the image 88, where eight iterations were performed and is compared to the image 84 reconstructed with an iterative process that uses only one prior solution (as opposed to a linear combination of multiple prior solutions) for update. Thus, as can be seen, images with more clinically relevant high-frequency detail information may be generated not only using less views, but with fewer iterations. In some embodiments, a 3D image formed from the limited tomographic dataset has an image quality less than and within an image margin of a full CT scanner image quality. For example, the image margin may be a variance or difference, such as 1%, 2%, 3%, etc. of the image quality of a full CT scanner image quality.

Figure 6:
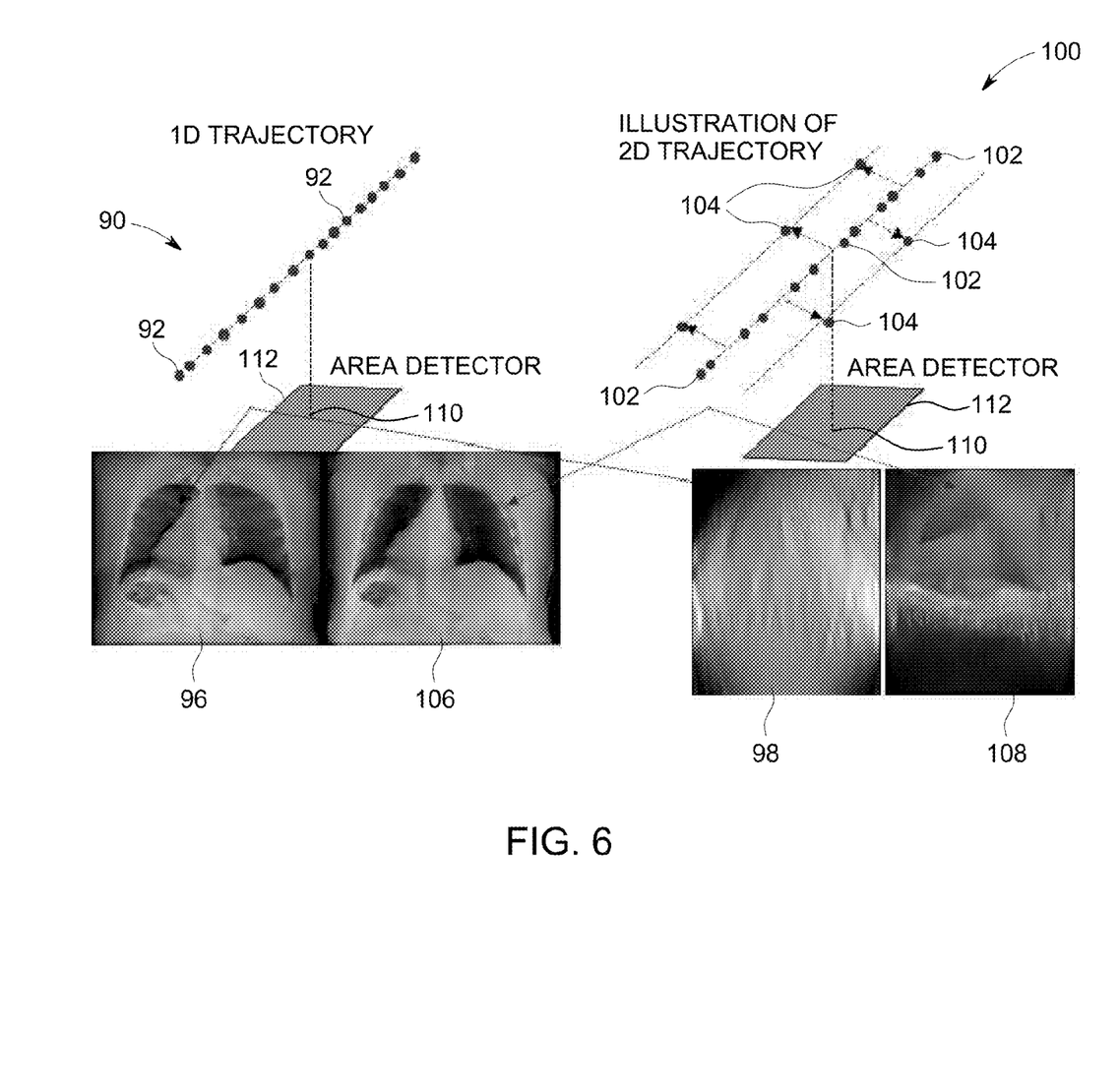
FIG. 6 is a diagram illustrating a source trajectory displacement method in accordance with various embodiments.

It should be noted that variations and modifications are contemplated. For example, as illustrated in FIG. 6, a modification in source trajectory, for example, the trajectory of an x-ray source may be provided. In particular, a one-dimensional (1D) trajectory 90 and a 2D trajectory 100 are illustrated as a plurality of trajectory points 92 and 102, respectively. The trajectories 90 and 100 correspond to a location 110 on an area 112 of a detector. In various embodiments, at least some, for example, every third trajectory point 104 of the 2D trajectory 100 is shifted laterally, which may include an alternating shifting pattern as shown. For example, the source is displaced in the lateral direction to obtain more image information, thereby allowing new trajectories. As can be seen, the images 106 and 108 (especially image 108) generated using the 2D trajectory 100 have greater depth resolution than the images 96 and 98 generated using the 1D trajectory 90. The images 96 and 106 show a horizontal slice through the object that is parallel to the detector and the images 98 and 108 show coronal slices (slices perpendicular to the detector) through the object.

Figure 7:
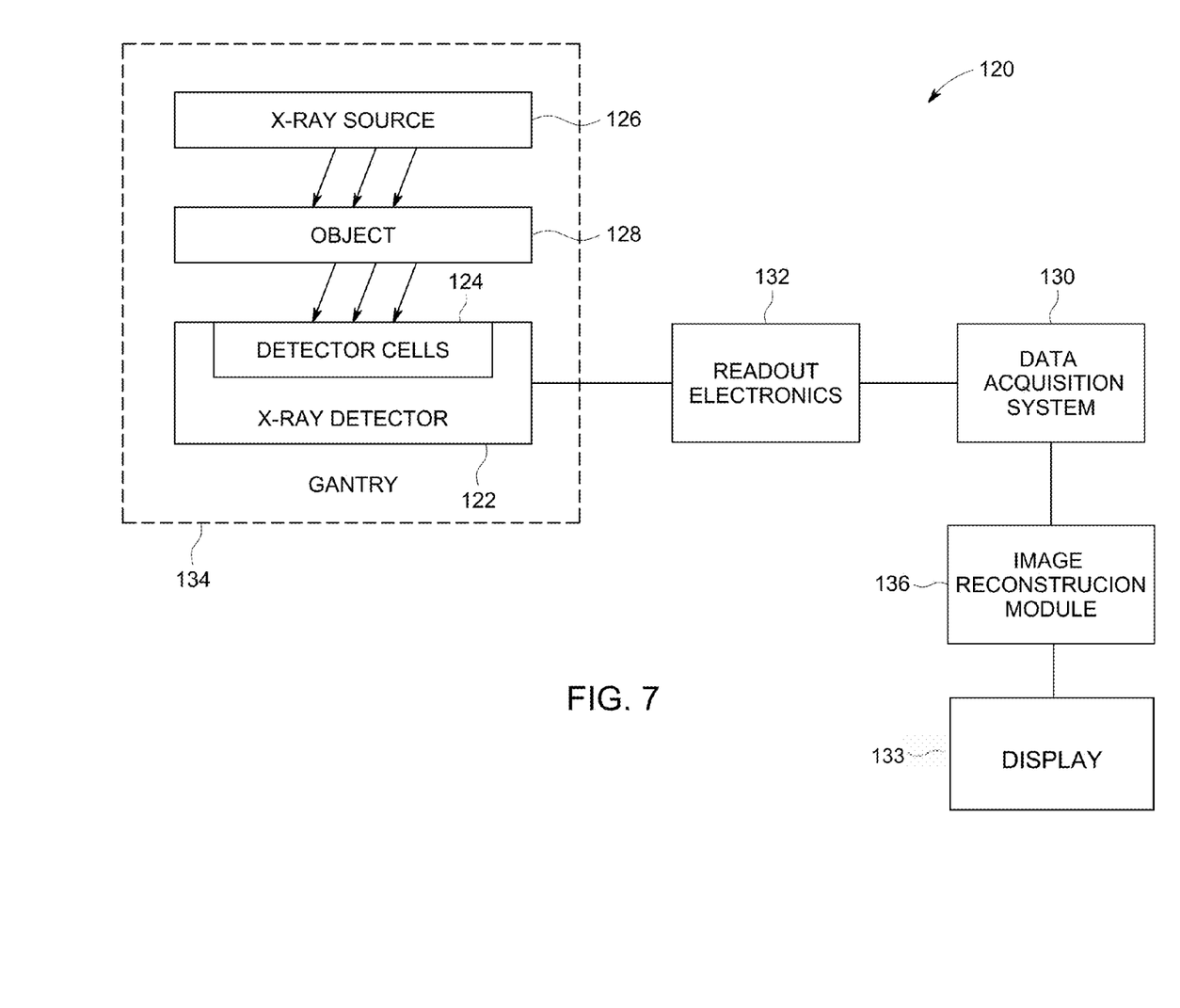
FIG. 7 is a block diagram of an imaging system formed in accordance with various embodiments.

The various embodiments, including the reconstruction methods may be implemented in connection with any type of x-ray imaging system. For example, as shown in FIG. 7, an imaging system 120, which is illustrated as an x-ray system can be used to acquire image views or projections for use in image reconstruction in accordance with various embodiments. The imaging system 120 generally includes an x-ray detector 122 having an array of detector cells 124 defining a scan area, and an x-ray source 126. An object 128, such as a patient is positioned between the x-ray source 126 and the x-ray detector 122, which may be one or more detectors or detector modules. The imaging system 120 also includes a data acquisition system 130 with readout electronics 132.

In one embodiment, the x-ray detector(s) 122 may be flat-panel detector systems such as an amorphous silicon flat panel detector or other type of digital x-ray image detector. In another embodiment, the x-ray detector(s) 122 may include a scintillator having a screen that is positioned in front of the x-ray detector(s) 122.

It should be noted that the imaging system 120 may be implemented as a non-mobile or mobile imaging system. Moreover, the imaging system 120 may be provided in different configurations. For example, the image data may be generated with the x-ray source 126 at discrete foci along an arc that completely surrounds the object 128 to generate the image information using CT procedures and processes. In another embodiment, the image data is generated with the x-ray source 126 at discrete foci along a smaller arc above the object to generate the image information using computed tomosynthesis procedures and processes. In other embodiments, the x-ray source 126 and the x-ray detector 122 are both mounted at opposite ends of a gantry 134, which may be a C-arm that rotates about the object 128. The rotatable C-arm is a support structure that allows rotating the x-ray source 126 and the x-ray detector 122 around the object 128 along a substantially circular arc, to acquire a plurality of projection images of the object 128 at different angles (e.g., different views or projections). It should be appreciated that various embodiments of image reconstruction may be provided in connection with a plurality of measured projections or image views regardless of the implementation of the apparatus or system that generates the projections or image data. It also should be appreciated that the various embodiments of image reconstruction may be provided in connection with a combination of two or more of the above described source/detector trajectories.

In operation, the object 128 is positioned in the imaging system 120 for performing an imaging scan. For example, the x-ray source 126 may be positioned above, below or around the object 128. For example, the x-ray source 126 (and the x-ray detector(s) 122) may be moved between different positions around the object 128 using the gantry 134. X-rays are transmitted from the x-ray source 126 through the object 128 to the x-ray detector(s) 122, which detect x-rays impinging thereon.

The readout electronics 132 may include a reference and regulation board (RRB) or other data collection unit. The RRB may accommodate and connect data modules to transfer data (e.g., a plurality of views or projections) from the x-ray detector(s) 122 to the data acquisition system 130. Thus, the readout electronics 132 transmit the data from the x-ray detector(s) 122 to the data acquisition system 130. The data acquisition system 130 forms an image from the data and may store, display on a display 133, and/or transmit the image. For example, the various embodiments may include an image reconstruction module 136, which may be implemented in hardware, software, or a combination thereof, that allows the data acquisition system to reconstruct images using limited tomographic data acquired from the x-ray detector(s) 122 and as described in more detail herein.

Thus, various embodiments provide iterative image reconstruction methods that form images, particularly 3D images, based on data having a lower number of image views or projections, for example, compared to a conventional CT scanner. Various embodiments also provide a fast converging method and apply to multiple system geometry configurations. Additionally, various embodiments include automated data driven reconstruction methods.

Some embodiments provide a tangible and non-transitory machine-readable medium or media having instructions recorded thereon for a processor or computer to operate an imaging apparatus to perform one or more embodiments of the methods described herein, for example, to implement the processes of the image reconstruction module. The medium or media may be any type of CD-ROM, DVD, floppy disk, hard disk, optical disk, flash RAM drive, or other type of computer-readable medium or a combination thereof.

The various embodiments and/or components, for example, the processors, or modules, components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reconstructing images, the method comprising:
   acquiring a plurality of image views using an x-ray imaging system, the plurality of image views defining a limited tomographic dataset;
   performing three-dimensional (3D) image reconstruction using the plurality of image views in an iterative reconstruction, wherein the iterative reconstruction includes forming a linear combination based on a plurality of previous iteration results; and
   displaying an image based on the image reconstruction, the image including clinically relevant high-frequency detail information.

2. A method in accordance with claim 1 further comprising using at least two prior iteration reconstruction results to update a convergence for the image reconstruction.

3. A method in accordance with claim 1, further comprising using an optimal gradient process for the iterative reconstruction.

4. A method in accordance with claim 3, wherein the optimal gradient process is a Nesterov optimal gradient process used to minimize a data consistency term for a cost function used in the iterative reconstruction.

5. A method in accordance with claim 1, wherein the iterative reconstruction includes a cost function minimization to a threshold level and wherein a value for a penalty weight for the cost function is automatically determined based on acquired image data including the plurality of image views.

6. A method in accordance with claim 5, wherein the automatic determination comprises using a statistical spread to set the weighting value.

7. A method in accordance with claim 1, wherein each iteration of the iterative reconstruction is defined by:

$$f^{n+1} = P[g^n + \tau A^T(y - A g^n)]$$

$$g^n = a(n)f^n + b(n)f^{n-1}$$

wherein P is a constraint operation, y is projection data corresponding to the projection views, A is a system operator, $A^T$ is the backprojection operator, f is the image to be displayed, a and b are previous iteration results, g is the linear combination of a and b, and τ is a scaling constant.

8. A method in accordance with claim 7, wherein P comprises a sparsification operation including at least one of thresholding in an image or other transform domain, total variation minimization, positivity and smoothness requirements.

9. A method in accordance with claim 1, wherein the image reconstruction comprises applying one of sparsity transforms and constraints.

10. A method in accordance with claim 1, further comprising determining when the image reconstruction has converged within a threshold, and wherein another iteration is performed if a result of the image reconstruction is not within the threshold and displaying the image if the result of the image reconstruction is within the threshold.

11. A method in accordance with claim 1, wherein the x-ray imaging system comprises operates in connection with one of a Positron Emission Tomography (PET) system or a Single Photon Emission Computed Tomography (SPECT) system.

12. A method in accordance with claim 1, wherein the iterative reconstruction forms a 3D image from the limited tomographic dataset, the 3D image having reduced artifacts.

13. A method in accordance with claim 12, wherein the limited tomographic dataset comprises between about 50 image views and about 100 image views.

14. A method in accordance with claim 12, wherein the 3D image formed from the limited tomographic dataset has an image quality less than and within an image margin of a full computed tomography (CT) scanner image quality.

15. A method in accordance with claim 1, wherein the imaging system acquiring the plurality of image views operates an x-ray source along a two-dimensional trajectory having laterally displaced trajectory points.

16. A method in accordance with claim 1, wherein the imaging system acquiring the plurality of image views operates an x-ray source along one of a circle, spiral, multiple line or sideways to an object trajectory.

17. A method in accordance with claim 1, further comprising using at least two of the previous iteration results for a subsequent update step when performing the 3D image reconstruction, the previous iteration results comprising prior image solutions.

18. A method in accordance with claim 1, further comprising using at least two of the previous iteration results for a subsequent update step when performing the 3D image reconstruction, the previous iteration results comprising prior image solutions not previously combined.

19. A method for reconstructing x-ray tomographic images, the method comprising:
   acquiring a plurality of image views using an x-ray imaging system, the plurality of image views defining a limited tomographic dataset;
   forming a linear combination of at least two reconstruction values for an iterative image reconstruction;
   applying at least one sparsity transformation;
   forward projecting the sparsity transformed linear combination and subtracting a result from data corresponding to the plurality of images views; and
   displaying a three-dimensional (3D) image when a convergence level has been reached, the 3D image formed from the limited tomographic dataset having an image quality less than and within an image margin of a full computed tomography (CT) scanner image quality.

20. A method in accordance with claim 19, wherein the at least two reconstruction values comprise two prior image reconstruction iteration solutions or two initial values.

21. A method in accordance with claim 19, further comprising automatically selecting weighting values for a cost function for the linear combination.

22. A method in accordance with claim 19, further comprising backprojecting a residual error based on the forward projection if a threshold for the convergence level is not reached.

23. A method in accordance with claim 19, wherein the linear combination is based on:

$$f^{n+1} = P[g^n + \tau A^T(y - A g^n)]$$

$$g^n = a(n)f^n + b(n)f^{n-1}$$

wherein P is a constraint operation, y is projection data corresponding to the projection views, A is a system operator, $A^T$ is the backprojection operator, f is the image to be displayed, a and b are previous iteration results, g is the linear combination of a and b, and τ is a scaling constant.

24. A tomographic x-ray imaging system comprising:
an x-ray source;
an x-ray detector configured to detect x-rays impinging thereon after passing through an object;
a data acquisition system configured to acquire limited tomographic data from the x-ray detector;
an image reconstruction module configured to perform image reconstruction using the limited tomographic data in an iterative reconstruction, wherein the iterative reconstruction includes forming a linear combination based on a plurality of previous iteration results; and
a display for displaying an image based on the image reconstruction, wherein the image includes clinically relevant high-frequency detail information.

25. A tomographic x-ray imaging system in accordance with claim 24, further comprising automatically selecting weighting values for the image reconstruction.

* * * * *